(12) United States Patent
Lee et al.

(10) Patent No.: US 9,769,629 B2
(45) Date of Patent: *Sep. 19, 2017

(54) METHOD OF TRANSMITTING MESSAGE AT USER EQUIPMENT IN WIRELESS COMMUNICATION SYSTEM AND APPARATUS THEREOF

(71) Applicant: LG ELECTRONICS INC., Seoul (KR)

(72) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 14/645,230

(22) Filed: Mar. 11, 2015

(65) Prior Publication Data

US 2015/0189480 A1 Jul. 2, 2015

Related U.S. Application Data

(63) Continuation of application No. 13/813,584, filed as application No. PCT/KR2012/002013 on Mar. 21, 2012, now Pat. No. 9,008,570.

(Continued)

(51) Int. Cl.
| | |
|---|---|
| *H04W 4/06* | (2009.01) |
| *H04H 20/72* | (2008.01) |
| *H04W 48/10* | (2009.01) |
| *H04W 72/00* | (2009.01) |
| *H04W 48/12* | (2009.01) |
| *H04W 36/10* | (2009.01) |

(52) U.S. Cl.
CPC .............. *H04W 4/06* (2013.01); *H04H 20/72* (2013.01); *H04W 48/10* (2013.01);
(Continued)

(58) Field of Classification Search
CPC ... H04W 48/12; H04W 72/005; H04W 36/10; H04W 48/16; H04W 52/0203
See application file for complete search history.

(56) References Cited

U.S. PATENT DOCUMENTS

| | | |
|---|---|---|
| 2002/0168985 A1 | 11/2002 | Zhao et al. |
| 2005/0041610 A1 | 2/2005 | Lee et al. |

(Continued)

FOREIGN PATENT DOCUMENTS

| | | |
|---|---|---|
| JP | 2004-519892 A | 7/2004 |
| JP | 2010-534987 A | 11/2010 |
| KR | 10-0964670 B1 | 6/2010 |

*Primary Examiner* — Raj Jain
(74) *Attorney, Agent, or Firm* — Birch, Stewart, Kolasch & Birch, LLP

(57) ABSTRACT

A user equipment (UE) in a wireless communication system is described. The UE includes a receiver, a processor and a transmitter. The receiver is configured to receive a multimedia broadcast multicast service (MBMS) counting request message through a first cell of a network. The processor is configured to determine whether or not to transmit a MBMS counting response message in response to the MBMS counting request message. The transmitter is configured to transmit the MBMS counting response message if it is determined to transmit the MBMS counting response message. The processor is further configured to determine to transmit the MBMS counting response message if a registered-public land mobile network (R-PLMN) identity is included in system information broadcast by the network.

6 Claims, 11 Drawing Sheets

Related U.S. Application Data

(60) Provisional application No. 61/471,179, filed on Apr. 3, 2011.

(52) U.S. Cl.
CPC .......... *H04W 72/005* (2013.01); *H04W 36/10* (2013.01); *H04W 48/12* (2013.01)

(56) References Cited

U.S. PATENT DOCUMENTS

| | | |
|---|---|---|
| 2005/0090278 A1* | 4/2005 | Jeong ................ H04W 36/0055 455/525 |
| 2007/0105557 A1* | 5/2007 | Israelsson ............. H04W 36/10 455/436 |
| 2008/0020763 A1* | 1/2008 | Fischer ................ H04W 72/005 455/435.1 |
| 2008/0273514 A1 | 11/2008 | Kuo |
| 2010/0080159 A1 | 4/2010 | Hu et al. |
| 2010/0189027 A1* | 7/2010 | Ishida ................... H04W 48/12 370/312 |
| 2010/0195534 A1 | 8/2010 | Song et al. |
| 2010/0234034 A1* | 9/2010 | Aoyama ............... H04W 48/12 455/450 |
| 2010/0272017 A1 | 10/2010 | Terry et al. |
| 2011/0021224 A1 | 1/2011 | Koskinen et al. |
| 2011/0305183 A1 | 12/2011 | Hsu et al. |
| 2016/0007321 A1* | 1/2016 | Zhang ................... H04W 48/12 370/312 |

* cited by examiner (a) Control-plane protocol stack (b) User-plane protocol stack

US 9,769,629 B2

METHOD OF TRANSMITTING MESSAGE AT USER EQUIPMENT IN WIRELESS COMMUNICATION SYSTEM AND APPARATUS THEREOF

CROSS-REFERENCE TO RELATED APPLICATIONS

This application is a continuation of U.S. patent application Ser. No. 13/813,584 filed on Jan. 31, 2013 (now U.S. Pat. No. 9,008,570 issued on Apr. 14, 2015), which is the National Phase of PCT International Application No. PCT/KR2012/002013 filed on Mar. 21, 2012, which claims priority under 35 U.S.C. 119(e) to U.S. Provisional Application No. 61/471,179 filed on Apr. 3, 2011. The entire contents of all of the above applications are hereby incorporated by reference.

BACKGROUND OF THE INVENTION

Field of the Invention

The present invention relates to a wireless communication system, and more particularly, to a method of transmitting a message from a user equipment in a wireless communication system and apparatus therefor.

Discussion of the Related Art

First of all, in the following description, 3GPP LTE (3rd generation partnership projecting long term evolution) communication, system is schematically explained as an example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to UE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

SUMMARY OF THE INVENTION

Based on the above-mentioned discussion, a method of transmitting a message from a user equipment in a wireless communication system and apparatus therefore shall be proposed in the following description.

To achieve these and other advantages and in accordance with the purpose of the present invention, as embodied and broadly described, a method for transmitting a message by a user equipment (UE) in a wireless communication system comprises receiving system information including a specific identifier from a network; receiving a request message from the network; and determining whether or not to transmit a response message to the network in response to the request message based on the specific identifier included in the system information.

Preferably, the method further comprises transmitting the response message to the network if the specific network identifier is an identity of R-PLMN (Registered-Public Land Mobile Network). Here, the request message includes at least one of services that the UE is receiving or interested to receive. Further, the system information is received through a first cell of the network, and the response message is transmitted through a second cell of the network.

More preferably, the determining step is performed while the UE is in an RRC (radio resource control) connected mode. Further, the request message comprises an MBMS (multimedia broadcast multicast service) counting request message and the response message comprises an MBMS counting response message In another aspect of the present invention, a method for receiving a message by a network in a wireless communication system comprises transmitting system information including a specific identifier to at least one user equipment (UE); transmitting a request message to the at least one UE; and receiving at least one response message from the at least one UE in response to the request message, the at least one response message being transmitted based on the specific identifier included in the system information.

Preferably, the specific identifier is a network identifier. More specifically, the specific network identifier is an identity of R-PLMN (Registered-Public Land Mobile Network).

According to an embodiment of the present invention, a base station is able to provide an effective MBMS to a user equipment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

DETAILED DESCRIPTION OF THE INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the UE system and the UE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
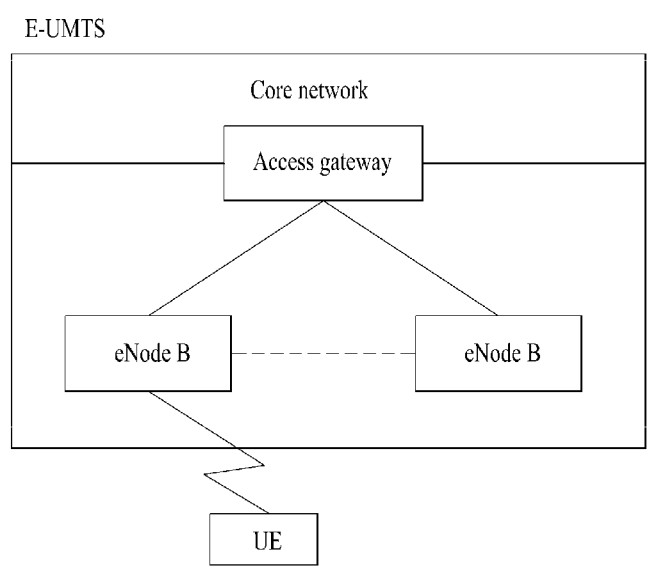
FIG. 1 is a schematic diagram of E-UMTS network structure as an example of a mobile communication system.
Figure 2:
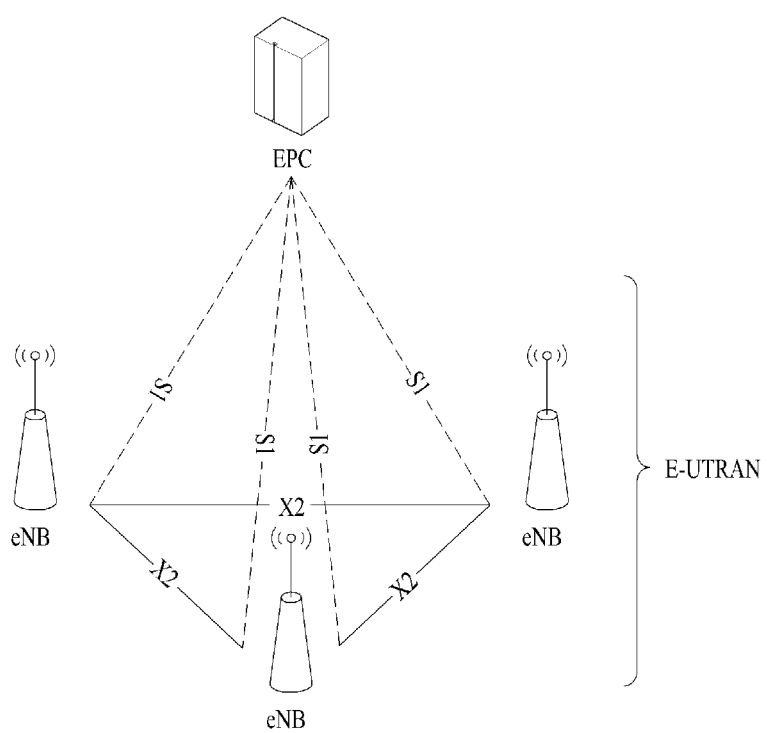
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
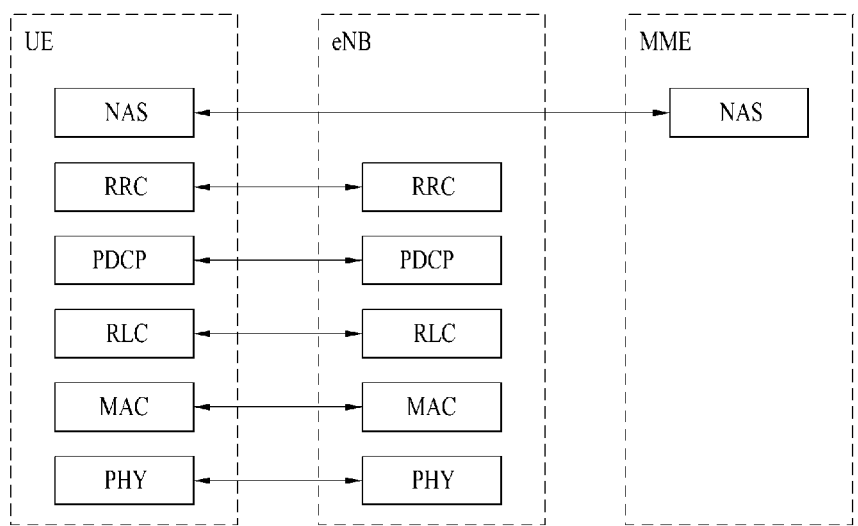
FIG. 3, including (a) and (b), is a diagram of structures of control and user planes of a radio interface protocol between a user equipment and E-UTRAN based on 3GPP radio access network specification.
Figure 3:
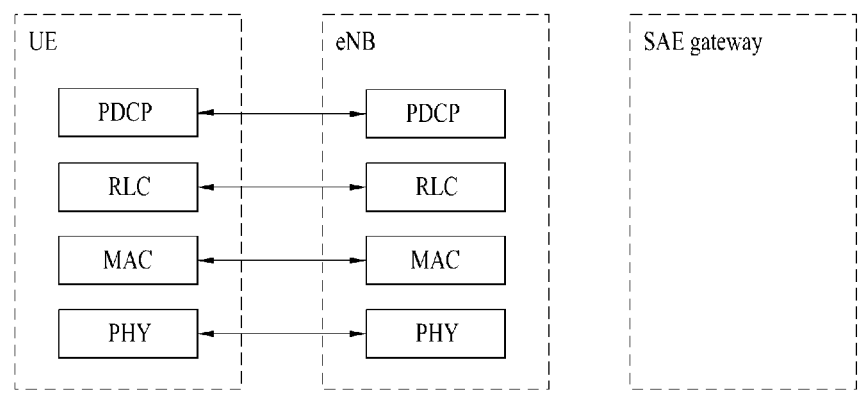

FIG. 3, including (a) and (b), is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, interact packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
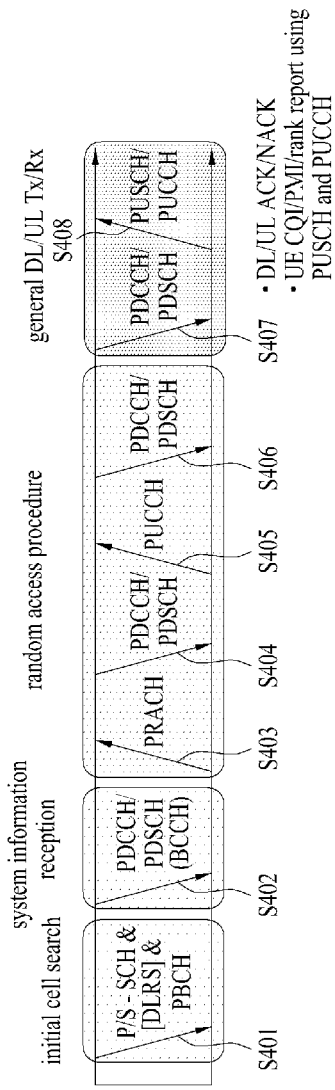
FIG. 4 is a diagram for explaining physical channels used for 3GPP system and a general method of transmitting a signal using the same.

FIG. 4 is a diagram for explaining physical channels used for 3GPP system and a general method of transmitting a signal using the same.

If a power of a user equipment is turned on or the user equipment enters a new cell, the user equipment performs an initial cell search for matching synchronization with a base station and the like [S401]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
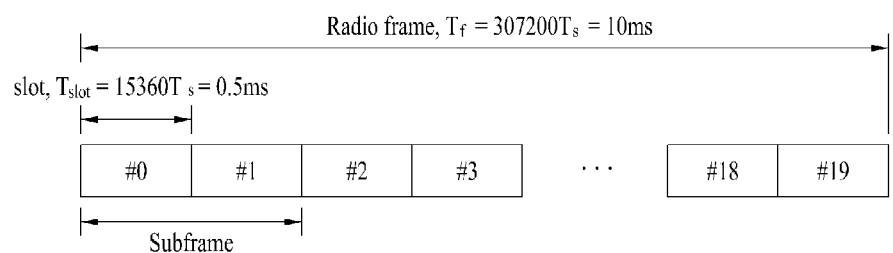
FIG. 5 is a diagram for an example of a structure of a radio frame used for UE system.

FIG. 5 is a diagram for an example of a structure of a radio frame used for UE system.

Referring to FIG. 5, a radio frame has a length of 10 ms (327200·Ts) and is constructed with 10 subframes in equal size. Each of the subframes has a length of 1 ms and is constructed with two slots. Each of the slots has a length of 0.5 ms (15360·Ts). In this case, Ts indicates a sampling time and is expressed as Ts=1/(15 kHz×2048)=3.2552×10−8 (about 33 ns). The slot includes a plurality of OFDM symbols in a time domain and includes a plurality of resource blocks (RB) in a frequency domain. In the UE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and a corresponding RRC connecting method are explained. In this case, the RRC state means whether an RRC of a user equipment is logically connected to an RRC of E-UTRAN (i.e., logical connection) if the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is manacled by a CN by a TA unit that is an area unit greater than a cell. In particular, in order to receive such a service as voice and data from a cell, a user equipment in an RRC idle state should make a transition to an RRC connected state.

Specifically, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

Figure 6:
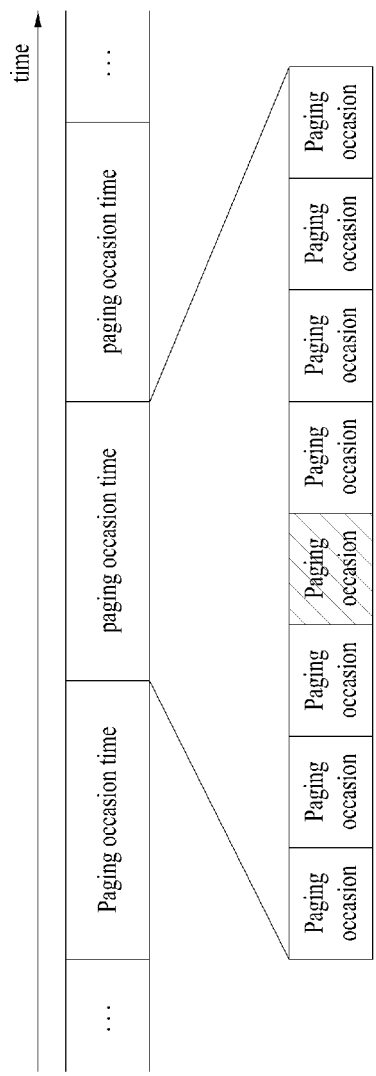
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or /MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs.

Figure 7:
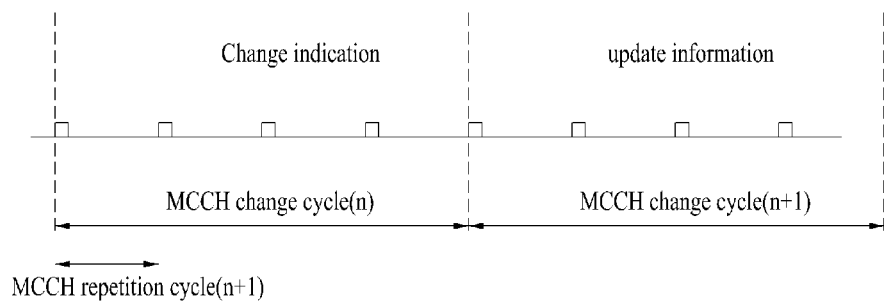
FIG. 7 is a diagram for a transmission scheme of MCCH (MBMS control channel).

FIG. 7 shows a transmission scheme of MCCH information.

Referring to FIG. 7, if an MBMS related RRC message is changed in a specific MCCH. PDCCH transmits M-RNTI (MBMS-radio network temporary identity) and an MCCH indicator indicating a specific MCCH. A user equipment, which supports MBMS, receives the M-RNTI and the MCCH indicator via the PDCCH, recognizes that the MBMS related RRC message has been changed, and is then able to receive the specific MCCH. The RRC message of the MCCH can be changed each change cycle and is repeatedly broadcasted each repetitive cycle.

Meanwhile, the MCCH transmits MBSFNAreaConfiguration message that indicates a ongoing MBMS session and a corresponding RB setting. And the MCCH is able to transmit an MBMS counting request (MBMSCountingRequest) message for counting the number of user equipments in an RRC connected state, each of which receives or intends to receive at least one MBMS service.

A specific MBMS control information can be provided via BCCH. In particular, the specific MBMS control information can be contained in SystemInformationBlockType13 broadcasted via the BCCH.

As described above, the network can count the number of user equipments, each of which receive or intends to receive a specific service, i.e. a specific MBMS, through an MBMS counting procedure. In a conventional MBMS counting procedure, if the network transmits an MBMS counting request message, the user equipment transmits an MBMS counting response message through a DCCH (dedicated control channel).

Figure 8:
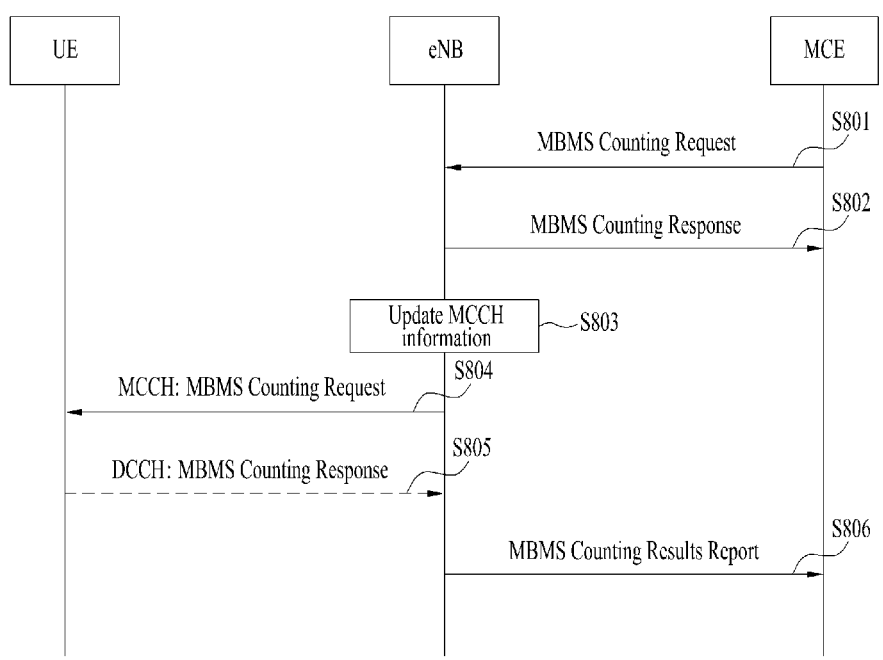
FIG. 8 is a flowchart showing a conventional MBMS counting procedure.

FIG. 8 is a flowchart showing a conventional MBMS counting procedure.

Referring to FIG. 8, a base station (eNB) starts a counting procedure according to an MBMS counting request from an MCE (MBMS coordinating entity) and an MBMS counting response corresponding thereto in steps S801 and S802. The MCE refers to a network entity performing admission control, radio resource allocation, session control signaling etc. Next, the eNB updates MCCH information according to information included in the MBMS counting request in step S803.

The eNB broadcasts an MBMS counting request message through an MCCH in step S804. The MBMS counting request message includes an MBMS ID list. A user equipment which monitors the MCCH in an MBSFN area may receive the counting request message through the MCCH. If an ID of a service that the user equipment intends to receive is included in the counting request message, the user equipment transmits an MBMS counting response message to the eNB through a DCCH in step S805.

Finally, the eNB may receive counting response messages for a corresponding service from a plurality of user equipments, counts the number of user equipments transmitting the response message and informs the MCE of an MBMS counting result in step S806.

Figure 9:
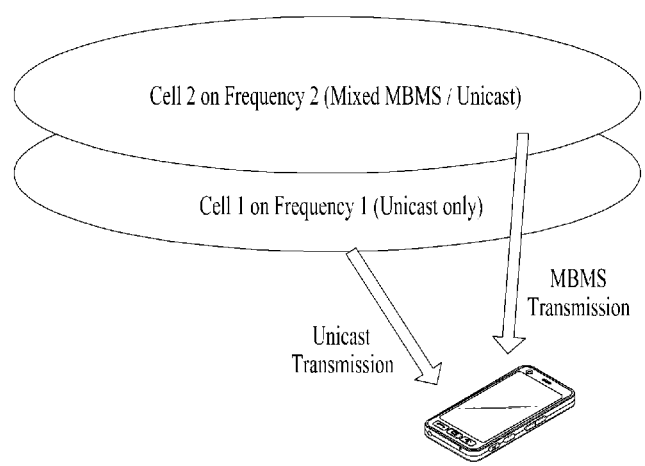
FIG. 9 is diagram for explaining problems which may be generated in the conventional MBMS counting procedure.

FIG. 9 is diagram for explaining problems which may be generated in the conventional MBMS counting procedure.

Referring to FIG. 9, if a user equipment which is RRC connected with a first cell of a first frequency intends to receive an MBMS from a second cell of a second frequency, the user equipment may receive an MBMS counting request message from an MCCH of the second cell. If an ID of the MBMS the user equipment intends to receive is included in the counting request message, the user equipment transmits an MBMS counting response message to the first cell.

Upon receiving the MBMS counting response message, the first cell transmits, if it supports the MBMS, an MBMS counting result to an MCE according to the received MBMS counting response message. However, if the first cell does not support the MBMS, the first cell disregards the received MBMS counting response message. In this case, a problem arises in that the user equipment has unnecessarily transmitted the MBMS counting response message.

Accordingly, the present invention is devised to solve the problem of unnecessary transmission of the MBMS counting response message by the user equipment. To this end, a user equipment, which is registered in a specific wireless network, i.e. a specific PLMN (public land mobile network) and is connected to a first cell, receives an MBMS counting request message from a second cell. If the MBMS counting request message is associated with the wireless network, the user equipment transmits an MBMS counting response message, and if the MBMS counting request message is not associated with the wireless network, the user equipment does not transmit the MBMS counting response message. Here, the first cell may be the same as or may be different from the second cell. The PLMN refers to a network ID of a mobile communication network provider.

Namely, the user equipment determines whether the MBMS counting request message is associated with the wireless network according to a PLMN ID broadcast through system information of the second cell. More specifically, if the PLMN ID broadcast through the system information of the second cell indicates a PLMN registered by the user equipment, (R-PLMN), the user equipment determines whether the MBMS counting request message is associated with the wireless network. Desirably, the first cell broadcasts the registered PLMN (R-PLMN) through the system information.

Figure 10:
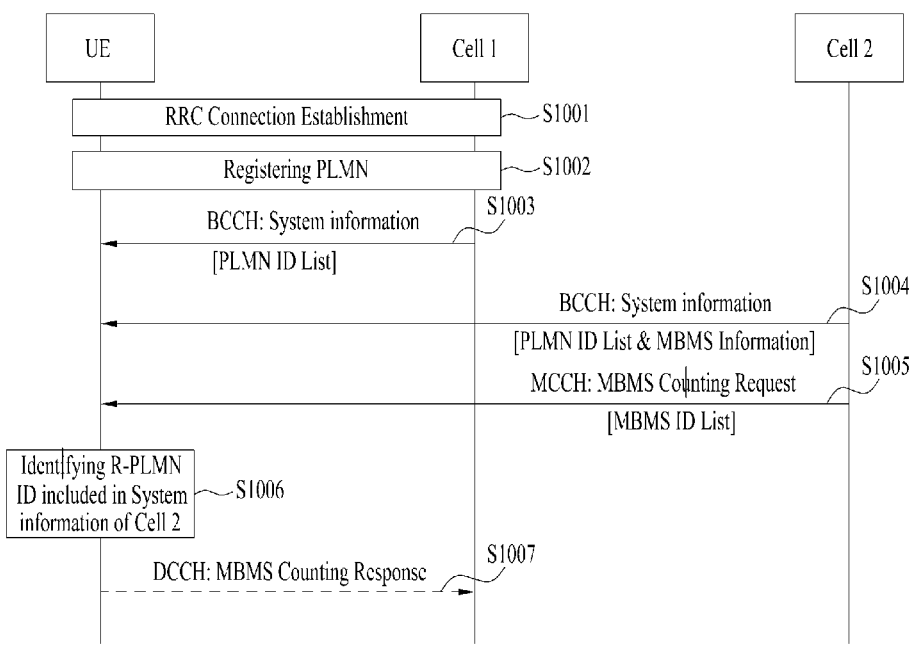
FIG. 10 is a flowchart showing an MBMS counting response message transmission scheme of a UE according to the present invention.

FIG. 10 is a flowchart showing an MBMS counting response message transmission scheme of a user equipment according to the present invention.

Referring to FIG. 10, the user equipment selects a wireless network of a service provider, i.e. a PLMN and selects a cell corresponding to the PLMN. Next, the user equipment establishes an RRC connection with the selected cell in step S1001 and registers itself in the selected PLMN in step S1002. Afterwards, a NAS layer of the user equipment is in an EMM-REGISTERED state. The PLMN in which the user equipment has been registered is referred to as an R-PLMN. The user equipment can perform an MBMS counting procedure only in an RRC connection mode. In FIG. 10, it is assumed that the user equipment is RRC connected with a first cell.

In step S1003, the user equipment receives system information broadcast by the first cell and continues to maintain the latest information. The system information may be broadcast through a BCCH. The first cell may support one or more PLMNs and broadcasts PLMN IDs (i.e. PLMN list) of the PLMNs supported thereby through system information. In this case, the R-PLMN of the user equipment should be included in the PLMN list.

Meanwhile, if the user equipment connected to the first cell intends to receive an MBMS broadcast by a second cell, the user equipment monitors system information broadcast through the BCCH from the second cell in step S1004. The system information broadcast from the second cell desirably includes PLMN IDs (i.e. PLMN list) supported by the second cell and MBMS information.

Next, the second cell may perform a counting procedure for the MBMS. At this time, the second cell broadcasts an MBMS counting request message through an MCCH in step S1005. The MBMS counting request message includes IDs of more than one MBMS.

According to the prior art, upon receiving the MBMS counting request message from the second cell, the user equipment responds to the MBMS counting request message when an ID of an MBMS that the user equipment intends to receive is included in the MBMS counting request message. However, in the present invention, the user equipment identifies whether an R-PLMN ID thereof is included in the PLMN list broadcast through the system information of the second cell in step S1006. Namely, the user equipment determines to respond to the MBMS counting request message only when the R-PLMN ID of the user equipment is broadcast through the system information of the second cell or through MCCH information. Here, the MBMS counting request message desirably includes the R-PLMN ID of the user equipment.

As a response to the MBMS counting request message, the user equipment transmits an MBMS counting response message to the first cell through a DCCH in step S1007.

As is apparent from the foregoing description, the user equipment, which is registered in a specific wireless network, i.e. a specific PLMN and is connected to the first cell, receives the MBMS counting request message from the second cell. If the MBMS counting request message is associated with the specific PLMN, the user equipment transmits the MBMS counting response message, and if the MBMS counting request message is not associated with the specific PLMN, the user equipment does not transmit the MBMS counting response message. Accordingly, the problem that the user equipment unnecessarily transmits the MBMS counting response message can be solved.

Figure 11:
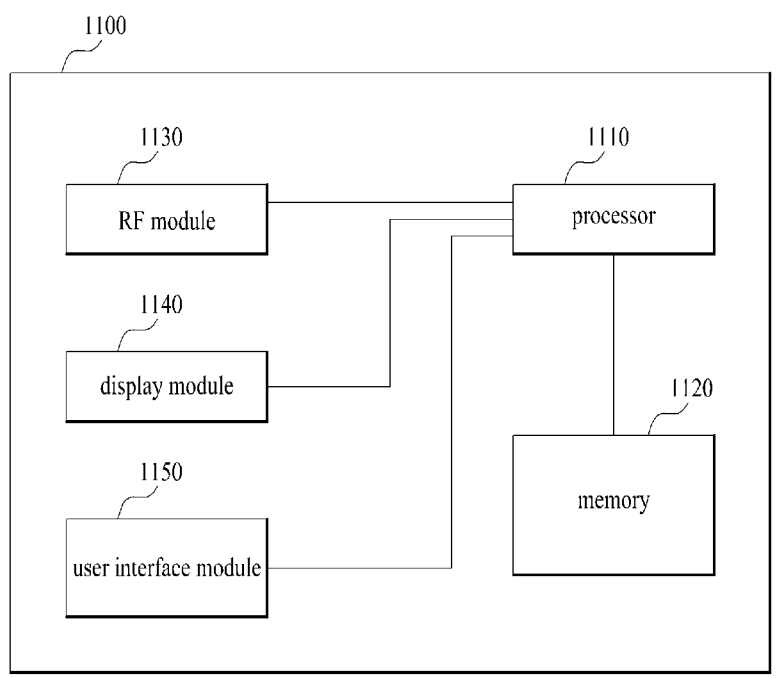
FIG. 11 is an exemplary block diagram of a communication apparatus according to one embodiment of the present invention.

FIG. 11 is an exemplary block diagram of a communication apparatus according to one embodiment of the present invention.

Referring to FIG. 11, a communication device 1100 includes a processor 1110, a memory 1120, an RF module 1130, a display module 1140 and a user interface module 1150.

The communication device 1100 is illustrated for clarity and convenience of the description and some modules can be omitted. Moreover, the communication device 1100 is able to further include at least one necessary module. And, some modules of the communication device 1100 can be further divided into sub-modules. The processor 1110 is configured to perform operations according to the embodiment of the present invention exemplarily described with reference to the accompanying drawings. In particular, the detailed operations of the processor 1110 can refer to the contents described with reference to FIGS. 1 to 10.

The memory 1120 is connected to the processor 1110 and stores an operating system, applications, program codes, data and the like. The RF module 1130 is connected to the processor 1110 and performs a function of converting a baseband signal a radio signal or converting a radio signal to a baseband signal. For this, the RF nodule 1130 performs analog conversion, amplification, filtering and frequency uplink transform or inverse processes thereof. The display module 1140 is connected to the processor 1110 and displays various kinds of informations. The display module 1140 can include such a well-known element as LCD (Liquid Crystal Display), LED (Light Emitting Diode), OLED (Organic Light Emitting Diode) and the like, by which the present invention is non-limited. The user interface module 1150 is connected to the processor 1110 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

As mentioned in the foregoing description, although a method for a user equipment to transmit a message in a wireless communication system and apparatus therefore is described mainly with reference to examples applied to 3GPP LTE system, the present invention is applicable to various kinds of wireless communication systems as well as the 3GPP LTE system.

What is claimed is:

1. A user equipment (UE) in a wireless communication system, the UE comprising:
   a transmitter;
   a receiver; and
   a processor configured to:
      control the receiver to receive system information and a multimedia broadcast multicast service (MBMS) counting request message through a first cell of a network,
      determine whether or not the system information includes a registered-public land mobile network (R-PLMN) identity, and
      control the transmitter to transmit a MBMS counting response message in response to the MBMS counting request message when the processor determines that the system information includes the R-PLMN identity,
      wherein the MBMS counting response message is not transmitted by the transmitter when the processor determines that the system information does not include the R-PLMN identity.

2. The UE of claim 1, wherein the MBMS counting response message is transmitted to a second cell of the network.

3. The UE of claim 1, wherein the processor is further configured to determine whether or not to transmit the MBMS counting response message in response to the MBMS counting request message while the UE is in a radio resource control (RRC) connected mode.

4. A network in a wireless communication system, the network comprising:
   a receiver; and
   a transmitter configured to transmit system info' nation and a multimedia broadcast multicast service (MBMS) counting request message through a first cell of the network to at least one user equipment (UE),
   wherein the receiver is configured to receive at least one MBMS counting response message transmitted by the at least one UE in response to receiving the MBMS counting request message, when the system information includes a registered-public land mobile network (R-PLMN) identity, and
   wherein the at least one UE does not transmit the at least one MBMS counting response message in response to receiving the MBMS counting request message, when the system information does not include the R-PLMN identity.

5. The network of claim 4, wherein the at least one MBMS counting response message is received through a second cell of the network.

6. The network of claim 4, wherein the at least one UE is in a radio resource control (RRC) connected mode.

* * * * *